(12) United States Patent
Qumruzzaman et al.

(10) Patent No.: US 12,041,451 B2
(45) Date of Patent: Jul. 16, 2024

(54) SYSTEMS AND METHODS FOR DETECTING DOMAIN CHANGES IN AN SD-WAN ENVIRONMENT

(71) Applicant: Cisco Technology, Inc., San Jose, CA (US)

(72) Inventors: Sheikh Qumruzzaman, Santa Clara, CA (US); Rahul Hardikar, San Ramon, CA (US); Kiran Desai, Santa Clara, CA (US); Biju Mathews Mammen, Mountain House, CA (US); Seshagirirao Lekkala, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 318 days.

(21) Appl. No.: 17/687,857

(22) Filed: Mar. 7, 2022

(65) Prior Publication Data
US 2023/0188987 A1 Jun. 15, 2023

Related U.S. Application Data

(60) Provisional application No. 63/265,236, filed on Dec. 10, 2021.

(51) Int. Cl.
*H04W 12/069* (2021.01)
*H04L 41/12* (2022.01)
(Continued)

(52) U.S. Cl.
CPC .......... *H04W 12/069* (2021.01); *H04L 41/12* (2013.01); *H04W 76/10* (2018.02); *H04W 84/12* (2013.01)

(58) Field of Classification Search
None
See application file for complete search history.

(56) References Cited

U.S. PATENT DOCUMENTS 10,826,775 B1 11/2020 Moreno et al.
10,826,815 B2 * 11/2020 Kim ..................... H04L 45/02
(Continued)

OTHER PUBLICATIONS

Cisco SD-WAN End-to-End Deployment Guide, Version 18.3.5/16.9.4, Jul. 2019.
(Continued)

*Primary Examiner* — Sai Aung
(74) *Attorney, Agent, or Firm* — Baker Botts L.L.P.

(57) ABSTRACT

In one embodiment, a method includes generating, by a first controller of a network, an overlay domain digest using a first domain digest associated with the first controller of the network and a second domain digest associated with a second controller of the network. The method also includes communicating, by the first controller, the overlay domain digest to an edge device of the network, updating, by the first controller, the overlay domain digest to generate an updated overlay domain digest, and communicating, by the first controller, the updated overlay domain digest to the edge device of the network. The method further includes detecting, by the edge device, a difference between the overlay domain digest and the updated overlay domain digest and re-establishing, by the edge device, a connection with an orchestrator of the network to determine a control plane domain change within the network.

20 Claims, 3 Drawing Sheets

(51) Int. Cl.
  *H04W 76/10* (2018.01)
  *H04W 84/12* (2009.01)

(56) References Cited

U.S. PATENT DOCUMENTS

| | | | |
|---|---|---|---|
| 2015/0163323 A1* | 6/2015 | Moreno | H04L 45/04 |
| | | | 709/201 |
| 2016/0261501 A1* | 9/2016 | Hegde | H04L 45/22 |
| 2019/0058646 A1* | 2/2019 | Kim | H04L 43/0835 |
| 2020/0177503 A1* | 6/2020 | Hooda | H04L 12/66 |
| 2020/0177606 A1 | 6/2020 | Valluri et al. | |
| 2020/0287976 A1 | 9/2020 | Theogaraj et al. | |
| 2021/0218712 A1* | 7/2021 | Zhao | H04L 63/0884 |

OTHER PUBLICATIONS

Network Service Orchestration: A Survey, Nathan F. Saraiva de Sousa et al., Department of Computer Engineering and Industrial Automation, University of Campinas, Brazil, Nov. 13, 2018.
OpenFlow-based Aggregation Mechanism for Communication in the Internet of Things, Shilpa Manda, Dissertation presented at the University of Dublin, Trinity College, Aug. 2019.

\* cited by examiner

SYSTEMS AND METHODS FOR DETECTING DOMAIN CHANGES IN AN SD-WAN ENVIRONMENT

CROSS-REFERENCE TO RELATED APPLICATIONS

This application claims benefit of U.S. Provisional Patent Application No. 63/265,236 filed Dec. 10, 2021 by Sheikh Qumruzzaman et al, and entitled "HIERARCHICAL-DIGEST BASED TOPOLOGY CHANGE DETECTION AT A MULTI-DOMAIN FORWARDING ENABLED SD-WAN DEVICE," which is incorporated herein by reference as if reproduced in its entirety.

TECHNICAL FIELD

The present disclosure relates generally to communication networks, and more specifically to systems and methods for detecting domain changes in a software-defined wide area network (SD-WAN) environment.

BACKGROUND

In certain SD-WAN overlays, the responsibility of communicating the information of an existing controller to the edge devices rests solely on the orchestration node. When a device joins the SD-WAN overlay, the orchestrator provides an updated list of controllers to the edge devices. The updated list may be based on the forwarding domains specified by the edge device in the register request packet.

DESCRIPTION OF EXAMPLE EMBODIMENTS

Overview

Figure 1:
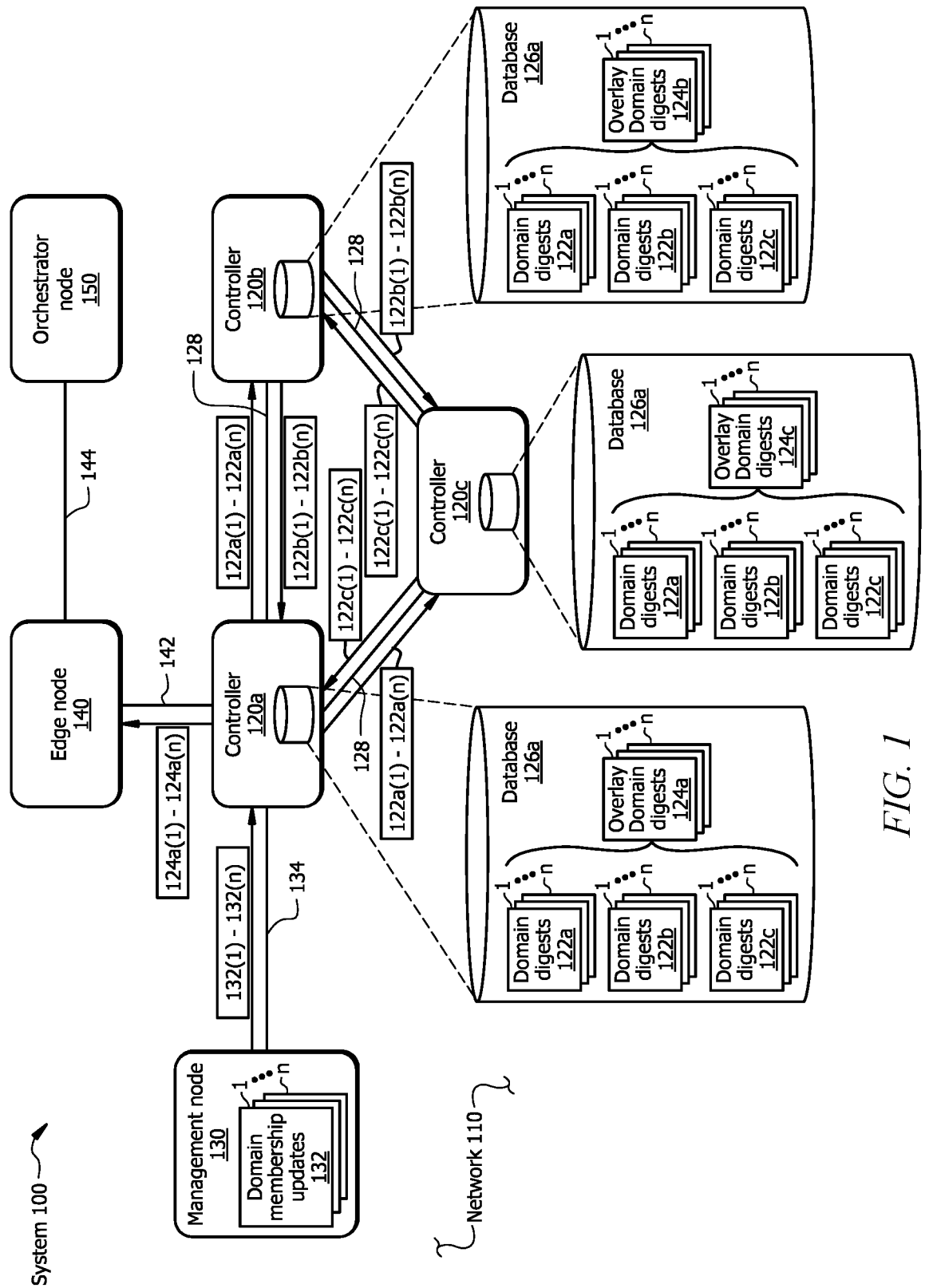
FIG. 1 illustrates an example system for detecting domain changes in an SD-WAN environment.

According to an embodiment, a system includes one or more processors and one or more computer-readable non-transitory storage media coupled to the one or more processors and including instructions that, when executed by the one or more processors, cause the system to perform operations. The operations include generating, by a first controller of a network, an overlay domain digest using a first domain digest associated with the first controller of the network and a second domain digest associated with a second controller of the network. The operations also include communicating, by the first controller, the overlay domain digest to an edge device of the network, updating, by the first controller, the overlay domain digest to generate an updated overlay domain digest, and communicating, by the first controller, the updated overlay domain digest to the edge device of the network. The operations further include detecting, by the edge device, a difference between the overlay domain digest and the updated overlay domain digest and re-establishing, by the edge device, a connection with an orchestrator of the network to determine a control plane domain change within the network.

In some embodiments, the first domain digest is a first signature representing a first ordered list of domains in which the first controller participates, and the second domain digest is a second signature representing a second ordered list of domains in which the second controller participates. In certain embodiments, generating the overlay domain digest includes performing a digest calculation of the first domain digest and the second domain digest using an Adelson, Velski, and Landis (AVL) tree. In some embodiments, the operations include receiving, by the first controller, a domain membership update from a network management node and generating, by the first controller, the first domain digest in response to receiving the domain membership update from the network management node.

In certain embodiments, the operations include communicating, by the first controller, the first domain digest to the second controller and receiving, by the first controller, the second domain digest from the second controller. In some embodiments, the first controller maintains a persistent control connection with the second controller.

In certain embodiments, the operations include maintaining, by the first controller, a database of domain digests. The database of domain digests may include the first domain digest and the second domain digest. In some embodiments, communicating, by the first controller, the overlay domain digest to the edge device includes encoding the overlay domain digest into a hello message and communicating the hello message to the edge device.

According to another embodiment, a method includes generating, by a first controller of a network, an overlay domain digest using a first domain digest associated with the first controller the network and a second domain digest associated with a second controller of the network. The method also includes communicating, by the first controller, the overlay domain digest to an edge device of the network, updating, by the first controller, the overlay domain digest to generate an updated overlay domain digest, and communicating, by the first controller, the updated overlay domain digest to the edge device of the network. The method further includes detecting, by the edge device, a difference between the overlay domain digest and the updated overlay domain digest and re-establishing, by the edge device, a connection with an orchestrator of the network to determine a control plane domain change within the network.

According to yet another embodiment, one or more computer-readable non-transitory storage media embody instructions that, when executed by one or more processors, cause the one or more processors to perform operations. The operations include generating, by a first controller of a network, an overlay domain digest using a first domain digest associated with the first controller of the network and a second domain digest associated with a second controller of the network. The operations also include communicating, by the first controller, the overlay domain digest to an edge device of the network, updating, by the first controller, the overlay domain digest to generate an updated overlay domain digest, and communicating, by the first controller, the updated overlay domain digest to the edge device of the network. The operations further include detecting, by the edge device, a difference between the overlay domain digest and the updated overlay domain digest and re-establishing, by the edge device, a connection with an orchestrator of the network to determine a control plane domain change within the network.

Technical advantages of certain embodiments of this disclosure may include one or more of the following. Certain embodiments of this disclosure allow edge nodes to detect domain changes in an SD-WAN environment without maintaining a persistent connection with the network orchestrator, which may improve the efficiency and/or reduce the workload on the network. Certain embodiments of this disclosure allow for cost benefits from economies of scale. Scale challenges associated with full-mesh routing on the transport side of the network may be reduced or eliminated.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for detecting domain changes in an SD-WAN environment. In a typical distributed and scaled SD-WAN overlay, the management plane is responsible for implementing configuration changes. Some of these configuration changes require that the devices to retreat and connect to the network orchestrator to re-run the load balancing algorithms of the edge devices (across the controllers) according to the forwarding domain (e.g., multi-tenancy/hierarchical SD-WAN) assignments that are newly done. One way to initiate the edge devices to retreat and connect to the orchestrator is an explicit Network Configuration Protocol (NETCONF) action notification from the network management system. However, there are scale implications at the network management system in terms of scheduling these notifications to all the edge devices. This disclosure describes systems and methods for the edge devices to detect domain changes in the SD-WAN environment without directly receiving the notification from the network management system.

FIG. 1 illustrates an example system 100 for detecting domain changes in an SD-WAN environment. System 100 or portions thereof may be associated with an entity, which may include any entity, such as a business, company, or enterprise, that detects domain changes in an SD-WAN environment. In certain embodiments, the entity may be a service provider that detects domain changes in an SD-WAN environment. The components of system 100 may include any suitable combination of hardware, firmware, and software. For example, the components of system 100 may use one or more elements of the computer system of FIG. 3. System 100 of FIG. 1 includes a network 110, controllers 120, domain digests 122, overlay domain digests 124, databases 126, a management node 130, domain membership updates 132, an edge node 140, and an orchestrator node 150.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN.

Network 110 may include one or more nodes. Nodes are connection points within network 110 that receive, create, store and/or send data along a path. Nodes may include one or more redistribution points that recognize, process, and forward data to other nodes of network. Nodes may include virtual and/or physical nodes. Nodes may include one or more virtual machines, hardware devices, bare metal servers, and the like. As another example, nodes may include data communications equipment such as computers, routers, servers, printers, workstations, switches, bridges, modems, hubs, and the like. In certain embodiments, nodes use static and/or dynamic routing to send data to and/or receive data to other nodes of system 100. In the illustrated embodiment of FIG. 1, nodes include node controllers 120, a management node 130, edge nodes 140, and an orchestrator node 150.

Controllers 120 of system 100 monitor, operate, manage, troubleshoot, and/or maintain services related to network 110. In the illustrated embodiment of FIG. 1, controllers 120 include controller 120a, controller 120b and controller 120c. In certain embodiments, controllers 120 (e.g., controller 120a, controller 120b and controller 120c) are centralized controllers that oversee the control plane of network 110. Controllers 120 may manage provisioning, maintenance, and/or security for network 110. In some embodiments, controllers 120 are primarily involved in control plane communication and do not handle data traffic. However, controllers 120 may control the flow of data traffic throughout network 110. In certain embodiments, controllers 120 works with orchestrator node 150 of system 100 to authenticate the edge nodes as they join network 110 and to orchestrate connectivity among the edge nodes.

In certain embodiments, controllers 120 (e.g., controller 120a, controller 120b and controller 120c) of system 100 establish and maintain control plane connections with a subset of edge nodes of network 110. For example, controller 120a may establish and maintain control plane connections with a first subset of edge nodes of network 110, controller 120b may establish and maintain control plane connections with a second subset of edge nodes of network 110, and controller 120c may establish and maintain control plane connections with a third subset of edge nodes of network 110. In the illustrated embodiment of FIG. 1, controller 120b establishes and maintains control plane connection 142 with edge node 140 of system 100.

In certain embodiments, each control plane connection runs as a Datagram Transport Layer Security (DTLS) tunnel that is established after successful authentication of the respective edge node 140. In certain embodiments, the connection carries the encrypted payload. This payload may include route information necessary for controllers 120 (e.g., controller 120a, controller 120b and controller 120c) to determine the network domain, and then to calculate the best routes to network destinations and distribute this route information to the edge nodes. In certain embodiments, the connection (e.g., the DTLS connection) between controller 120 and the edge nodes are permanent connections. Controllers 120 may have no direct peering relationships with any devices that the edge nodes connect to on the service side.

In certain embodiments, each controller 120 (e.g., controller 120a, controller 120b or controller 120c) is associated with one or more domains. A domain is a logical grouping of controllers 120 and edge nodes that demarcates the span of control for controllers 120. For example, controller 120a may be logically grouped with a first subset of edge nodes, controller 120b may be logically grouped with a second subset of edge nodes, and controller 120c may be logically grouped with a third subset of edge nodes. Each domain may be identified by a unique integer, called the domain ID.

In certain embodiments, a domain includes a list of tenants. A tenant is a logical container for application policies. A tenant may allow an administrator to exercise domain-based access control. In certain embodiments, a tenant is a unit of isolation from a policy perspective. A tenant may represent a customer in a service provider setting, an organization or domain in an enterprise setting, a grouping of policies, and the like. A tenant may include one or more filters, contracts, outside networks, bridge domains, Virtual Routing and Forwarding (VRF) instances, application profiles, etc.

In certain embodiments, a domain includes a list of regions. Each region is a group of network nodes that share common characteristics and/or common resources. Regions may be differentiated by the resources assigned to each region, its geographical location, a combination thereof, and the like. In certain embodiments, each region is a separate geographical area. Regions may be isolated from each other. In certain embodiments, each region includes one or more data centers. Each region may be associated with a particular service provider (e.g., Amazon Web Services (AWS)), a particular geographical location (e.g., US-East-1, US-East-2, US West (Oregon), Asia Pacific (Hong Kong), etc.), and the like.

In certain embodiments, controllers 120 (e.g., controller 120a, controller 120b, and controller 120c) use the information associated with the domains to generate domain digests 122. In the illustrated embodiment of FIG. 1, domain digests 122 include domain digests 122a associated with controller 120a, domain digests 122b associated with controller 120b, domain digests 122c associated with controller 120c. In the illustrated embodiment of FIG. 1, controller 120a generates domain digests 122a, controller 120b generates domain digests 122b, and controller 120c generates domain digests 122c.

Domain digests 122a of controller 120a include domain digests 122a(1) through 122a(n) (where n represents any suitable integer), domain digests 122b of controller 120b include domain digests 122b(1) through 122b(n) (where n represents any suitable integer), and domain digests 122c of controller 120c include domain digests 122c(1) through 122c(n) (where n represents any suitable integer). In certain embodiments, controllers 120 (e.g., controller 120a, controller 120b, and controller 120c) of system 100 use domain membership updates 132 to generate domain digests 122.

The participation of controller 120a, controller 120b, and/or controller 120c in a subset of domains-of-interest may result in a local digest calculation that generates local domain digests 122a, local domain digests 122b, and local domain digests 122c, respectively. In some embodiments, each domain digest 122 is a signature that describes an ordered list of domains (e.g., region domains, tenant domains, etc.) in which controller 120 (controller 120a, controller 120b, or controller 120c) participates.

In a highly available, scalable control plane, at hosted controllers 120 (e.g., controller 120a, controller 120b, and controller 120c), forwarding domain memberships (e.g., tenant/region domain memberships) may be changed (e.g., added or removed dynamically) to satisfy the scale requirement. Domain membership updates 132 are lists (e.g., tenant lists or region lists) associated with a particular controller 120 (e.g., controller 120a, controller 120b, or controller 120c). Domain membership updates 132 include domain membership updates 132(1) through 132(n) (where n represents any suitable integer).

Controllers 120 (e.g., controller 120a, controller 120b, and controller 120c) of system 100 exchange domain digests 122 (e.g., domain digests 122a, domain digests 122b, and domain digests 122c) with all connected controllers 120 (e.g., controller 120a, controller 120b, and controller 120c) of system 100 over peering control connections 128. For example, controller 120a communicates domain digests 122a(1) through 122a(n) to controller 120b and controller 120c, controller 120b communicates domain digests 122b(1) through 122b(n) to controller 120a and controller 120c, and controller 120c communicates domain digests 122c(1) through 122c(n) to controller 120a and controller 120b.

In certain embodiments, controllers 120 (e.g., controller 120a, controller 120b, and controller 120c) of system 100 insert domain digests 122 (e.g., domain digests 122a, domain digests 122b, and domain digests 122c) into a domain digest tree (e.g., an AVL tree). For example, controller 120a may insert its own local domain digests 122a, domain digests 122b received from controller 120b, and domain digests 122c received from controller 120c in its own domain digest tree, controller 120b may insert its own local domain digests 122b, domain digests 122a received from controller 120a, and domain digests 122c received from controller 120c in its own domain digest tree, and controller 120c may insert its own local domain digests 122c, domain digests 122b received from controller 120b, and domain digests 122a received from controller 120a in its own domain digest tree. In certain embodiments, domain digests 122 (e.g., domain digests 122a) are keyed by the universally unique identifier (UUID) of its respective controller 120 (e.g., controller 120a).

Controllers 120 of system generate overlay domain digests 124. In certain embodiments, overlay domain digests 124 are generated by performing a digest calculation of domain digests 122 (e.g., domain digests 122a, domain digests 122b, and domain digests 122c) associated with connected controllers 120 (e.g., controller 120a, controller 120b, and controller 120c). The digest calculation for overlay domain digests 124 may be performed using a database representation that ensures ordering of the keyed information (e.g., an AVL tree). In some embodiments, overlay domain digests 124 are calculated by performing successive digest calculations of each domain digest 122 in the database representation.

In the illustrated embodiment of FIG. 1, overlay domain digests 124 include overlay domain digests 124a associated with controller 120a, overlay domain digests 124b associated with controller 120b, and overlay domain digests 124c associated with controller 120c. Overlay domain digests 124a of controller 120a include overlay domain digests 124a(1) through 124a(n) (where n represents any suitable integer), overlay domain digests 124b of controller 120b include overlay domain digests 124b(1) through 124b(n) (where n represents any suitable integer), and overlay domain digests 124c of controller 120c include overlay domain digests 124c(1) through 124c(n) (where n represents any suitable integer).

Each overlay domain digest 124 (e.g., overlay domain digest 124a(1)) represents an aggregated digest of domain digests 122 (e.g., domain digest 122*a*(1), domain digest 122(*b*)(1), and domain digest 122(*c*)(1)) for the group of connected controllers 120 (e.g., controller 120*a*, controller 120*b*, and controller 120*c*). In certain embodiments, controller 120*a* generates overlay domain digests 124*a*(1) through 124*a*(*n*) using domain digests 122*a*(1) through 122*a*(*n*) (its own domain digests), domain digests 122*b*(1) through 122*b*(*n*) received from controller 120*b*, and domain digests 122*c*(1) through 122*c*(*n*) received from controller 120*c*. Controller 120*b* generates overlay domain digests 124*b*(1) through 124*b*(*n*) using domain digests 122*a*(1) through 122*a*(*n*) received from controller 120*a*, domain digests 122*b*(1) through 122*b*(*n*) (its own domain digests), and domain digests 122*c*(1) through 122*c*(*n*) received from controller 120*c*. Controller 120*c* generates overlay domain digests 124*a*(1) through 124*a*(*n*) using domain digests 122*a*(1) through 122*a*(*n*) received from controller 120*a*, domain digests 122*b*(1) through 122*b*(*n*) received from controller 120*b*, and domain digests 122*c*(1) through 122*c*(*n*) (its own domain digests).

In certain embodiments, overlay domain digests 124*a*, overlay domain digests 124*b*, and overlay domain digests 124*c* are the same. For example, overlay domain digest 124*a*(1), overlay domain digest 124*b*(1), and overlay domain digest 124*c*(1) may all be the same since they are all generated the same way using the same information (e.g., domain digest 124*a*(1), domain digest 124*b*(1), and 124*c* (1)). As another example, overlay domain digest 124*a*(2), overlay domain digest 124*b*(2), and overlay domain digest 124*c*(2) may all be the same since they are all generated the same way using the same information (e.g., domain digest 124*a*(2), domain digest 124*b*(2), and 124*c*(2)).

In certain instances, one or more overlay domain digests 124*a*(1) through 124*a*(*n*) may be the same, one or more overlay domain digests 124*b*(1) through 124*a*(*n*) may be the same, and/or one or more overlay domain digests 124*c*(1) through 124*c*(*n*) may be the same, depending on the network domain. However, in some instances, one or more overlay domain digests 124*a*(1) through 124*a*(*n*) may be different, one or more overlay domain digests 124*b*(1) through 124*a* (*n*) may be different, and/or one or more overlay domain digests 124*c*(1) through 124*c*(*n*) may be different. For example, controller 120*a* of system 100 may receive domain membership update 123(2) related to a change in the network domain, which results in a change in domain digest 122*a*(2) (as compared to domain digest 122*a*(1)). Overlay domain digest 124*a*(2) is changed accordingly, which results in a difference between overlay domain digest 124*a*(1) and domain digest 124*a*(2).

In certain embodiments, overlay domain digests 124 (e.g., overlay domain digests 124*a*, overlay domain digests 124*b*, and overlay domain digests 124*c*) are encoded into hello messages that controllers 120 (e.g., controller 120*a*, controller 120*b*, and controller 120*c*) exchange with edge nodes (e.g., edge node 140). Any change in the participation domain by controller 120 (e.g., controller 120*a*, controller 120*b*, or controller 120*c*) will result in a re-computation of its local domain digest 122 (e.g., local domain digest 122*a* (1) for controller 120*a*, local domain digest 122*b*(1) for controller 120*b*, or local domain digest 122*c*(1) for controller 120*c*)) and a subsequent recompilation of overlay domain digests 124 at every participating controller 120 (e.g., overlay domain digest 124*a*(1) for controller 120*a*, overlay domain digest 124*b*(1) for controller 120*b*, or overlay domain digest 124*c*(1) for controller 120*c*). The edge nodes (e.g., edge node 140) connected to controllers 120 (e.g., controller 120*a*) can now be notified of the change in the participating domain via overlay domain digests 124 (e.g., overlay domain digests 124*a*). The edge nodes (e.g., edge node 140) will in turn retreat to its orchestrator node (e.g., orchestrator node 150) to re-acquire the latest controller set that orchestrator node 150 orchestrates for the edge nodes.

Controllers 120 may store domain digests 122 and/or overlay domain digests 124 in databases 126. For example, controller 120*a* may maintain database 126*a* of domain digests 122*a*, domain digests 122*b*, domain digests 122*c*, and overlay domain digests 124*a*. As another example, controller 120*b* may maintain database 126*b* of domain digests 122*a*, domain digests 122*b*, and domain digests 122*c*, and overlay domain digests 124*b*. As still another example, controller 120*c* may maintain database 126*c* of domain digests 122*a*, domain digests 122*b*, and domain digests 122*c*, and overlay domain digests 124*c*. In certain embodiments, each database 126 of domain digests 122 and/or overlay domain digests 124 may be organized in a sorted manner. For example, domain digests 122 (e.g., domain digests 122*a*, domain digests 122, and domain digests 122*c*) may be organized based on the UUID of the respective controller 120 (e.g., controller 120*a*, controller 120*b*, and controller 120*c*, respectively).

Management node 130 of system 100 is a centralized network management system that allows a user to configure and/or manage the entire overlay network from a graphical dashboard. In certain embodiments, management node 130 includes a dashboard (e.g., a graphical dashboard). The dashboard of management node 130 may provide a visual window into network 110 that allows a user to configure and/or manage the edge nodes. In certain embodiments, management node 130 is software that runs on one or more servers of network 110. This server may be situated in a centralized location (e.g., a data center). In certain embodiments, the software of management node 130 may run on the same physical server as the software of one or more controllers 120.

In certain embodiments, management node 130 initiates configuration changes to the domain of network 110. For example, management node 130 may initiate the addition/removal of one or more nodes of system 100. In some embodiments, management node 130 generates domain membership updates 132 (e.g., domain membership updates 132(*a*) through 132(*n*)). For example, management node 130 may generate domain membership updates 132 in response to input from a user (e.g., a network administrator) into the dashboard of management node 130. Domain membership updates 132 may include changes in controller participation, changes to one or more tenant lists, changes to one or more region lists, and the like. In the illustrated embodiment of FIG. 1, management node 130 communicates domain membership updates 132 (e.g., domain membership updates 132(1) through 132(*n*)) to controller 120*a* via connection 134 (e.g., a NETCONF connection). Controller 120*a* uses domain membership updates 132 to generate domain digests 122*a* (e.g., domain digests 122*a*(1) through 122*a*(*n*)), which controller 120*a* in turn uses to generate overlay domain digests 124*a* (e.g., overlay domain digests 124*a*(1) through 124*a*(*n*)). Controller 120*a* communicates overlay domain digests 124*a* to edge node 140.

Edge node 140 of system 100 is a computer that provides an interface for communicating with other nodes of network 110. In certain embodiments, edge node 140 is located at the perimeter of a site (e.g., a remote office, a branch, a campus, a data center, etc.). In some embodiments, edge node 140 provides connectivity among the sites. Edge node 140 may include one or more hardware devices, software (e.g., a cloud router) that runs as a virtual machine, and the like. Edge node 140 handles the transmission of data traffic. In some embodiments, basic authentication of edge node 140 is performed using certificates and/or Ron Rivest, Adi Shamir, and Leonard Adleman (RSA) cryptography.

In certain embodiments, edge node 140 receives overlay domain digests 124a (e.g., overlay domain digests 124a(1) through 124a(n)) from controller 120a. Edge node 140 may compare overlay domain digests 124a received from controller 120a. In certain instances, edge node 140 compares consecutively received overlay domain digests 124a. For example, edge node 140 may compare overlay domain digest 124a(1) received from controller 120a to the following overlay domain digest 124a(2) received from controller 120a. If edge node 140 determines that two consecutively received overlay domain digests 124a are different, then edge node 140 detects a change in the control plane domain within network 110. The change may include a change in controller participation, tenant participation, region participation, and the like. Upon detecting the change in the control plane domain within network 110, edge node 140 re-establishes connection 144 (e.g., a DTLS control session) with orchestrator node 150 of network 110.

Orchestrator node 150 of system 100 automatically orchestrates connectivity between the edge nodes and controllers 120 (e.g., controller 120a, controller 120b, and controller 120c) of system 100. In certain embodiments, orchestrator node 150 is software that runs as a process (e.g., daemon) on one or more edge nodes. In a domain with multiple controllers 120, orchestrator node 150 may automatically perform load balancing of edge nodes across controllers 120 when edge nodes come online. In certain embodiments, orchestrator node 150 has a persistent control plane connection (e.g., a DTLS tunnel connection) with each controller 120 in its domain. In the illustrated embodiment of FIG. 1, orchestrator node 150 uses connection 144 to communicate with edge node 140. For example, orchestrator node 150 may use a DTLS connection to communicate with edge node 140 when edge node 140 comes online. Orchestrator node 150 may authenticate edge node 140 and facilitate the ability of edge node 140 to join network 110. If any controller 120 and/or edge node of system 100 is behind a network address translation (NAT), orchestrator node 150 may perform the initial NAT-traversal.

In certain embodiments, in a steady state or equilibrium condition, edge node 140 is connected to controller 120a and maintains no persistent connection with orchestrator node 150. Upon a change to the domain membership of the realm of controller 120a, edge node 140 connected to controller 120a re-establishes connection 144 to orchestrator node 150 to re-acquire the new list of controllers and/or domain memberships. Edge node 140 then builds the controller connections that are load balanced/rebalanced while dropping a few existing connections according to the result of the load balancing algorithm at edge node 140.

In certain embodiments, all edge nodes in the overlay, upon detecting a change in overlay domain digests 124, connect to orchestrator node 150 regardless of the domain-of-interest being affected. This may prove burdensome on orchestrator node 150, which entertains the entire set of devices in the overlay trying to reach out to it in a brief period of time. This sudden impact scenario may be mitigated using a query fired by each edge node toward controller 120 to which the edge node has a current control connection to retrieve any domain-centric digest at controller 120. Each edge node (e.g., edge node 140) can then make a domain-specific determination as to whether to connect orchestrator node 150 to collect the latest set of controllers 120.

In operation, management node 130 of system 100 communicates domain membership update 132(1) (e.g., a tenant/region update) to controller 120a over connection 134 (e.g., a NETCONF session). Upon receiving domain membership update 132(2) from management node 130, controller 120a creates domain digest 122a(2) for all tenant and/or region domains. Each participating controller 120 (controller 120a, controller 120b, and controller 120c) exchanges its domain digest 122 (domain digest 122a(2), domain digest 122b(2), and domain digest 122c(2), respectively) with all the other connected controllers 120 over a secure control connection. Each domain digest 122 received as part of this exchange is stored in a domain digest tree (e.g., an AVL tree) keyed by the peer controller UUID. Each controller 120 inserts its own domain digest 122 into its domain digest tree.

Each controller 120 (controller 120a, controller 120b, and controller 120c) calculates overlay domain digest 124 (e.g., overlay domain digest 124a(2), overlay domain digest 124b(2), and overlay domain digest 124c(2), respectively) by performing a digest calculation of each domain digest 122 (domain digest 122a(2), domain digest 122b(2), and domain digest 122c(2)) in the domain digest tree. Controller 122a encodes overlay domain digest 124a(2) in a Type-Length-Value (TLV) and exchanges overlay domain digest 124a(2) with connected edge node 140 as part of a hello message. Edge node 140 compares overlay domain digest 124a(2) with previously received overlay domain digest 124a(1) from controller 120a and updates overlay domain digest 124a(1) to overlay domain digest 124a(2) if a difference is detected. Upon detecting a difference between overlay domain digests 124a(1) and 124a(2), edge node 140 connects to orchestrator node 150 to learn about domain-specific control plane domain changes.

Although FIG. 1 illustrates a particular number of networks 110, controllers 120 (e.g., controller 120a, controller 120b and controller 120c), domain digests 122 (e.g., domain digests 122a(1) through 122a(n), domain digests 122b(1) through 122b(n)), and domain digests 122c(1) through 122c(n)), overlay domain digests 124 (e.g., overlay domain digests 124a(1) through 122a(n), overlay domain digests 124b(1) through 122b(n), and overlay domain digests 124c(1) through 122c(n)), databases 126 (e.g., database 126a, database 126b, and database 126c), management nodes 130, domain membership updates 132, edge nodes 140, and orchestrator nodes 150, this disclosure contemplates any suitable number of networks 110, controllers 120, domain digests 122, overlay domain digests 124, databases 126, management nodes 130, domain membership updates 132, edge nodes 140, and orchestrator nodes 150. For example, system 100 may include more or less than three controllers 120.

Although FIG. 1 illustrates a particular arrangement of a network 110, controllers 120 (e.g., controller 120a, controller 120b and controller 120c), domain digests 122 (e.g., domain digests 122a(1) through 122a(n), domain digests 122b(1) through 122b(n)), overlay domain digests 124 (e.g., overlay domain digests 124a(1) through 122a(n), overlay domain digests 124b(1) through 122b(n), and overlay domain digests 124c(1) through 122c(n)), databases 126 (e.g., database 126a, database 126b, and database 126c), management node 130, domain membership updates 132, edge node 140, and orchestrator node 150, this disclosure contemplates any suitable arrangement of a network 110, controllers 120, domain digests 122, overlay domain digests 124, databases 126, management node 130, domain membership updates 132, edge node 140, and orchestrator node 150. Furthermore, although FIG. 1 describes and illustrates particular components, devices, or systems carrying out particular actions, this disclosure contemplates any suitable combination of any suitable components, devices, or systems carrying out any suitable actions.

Figure 2:
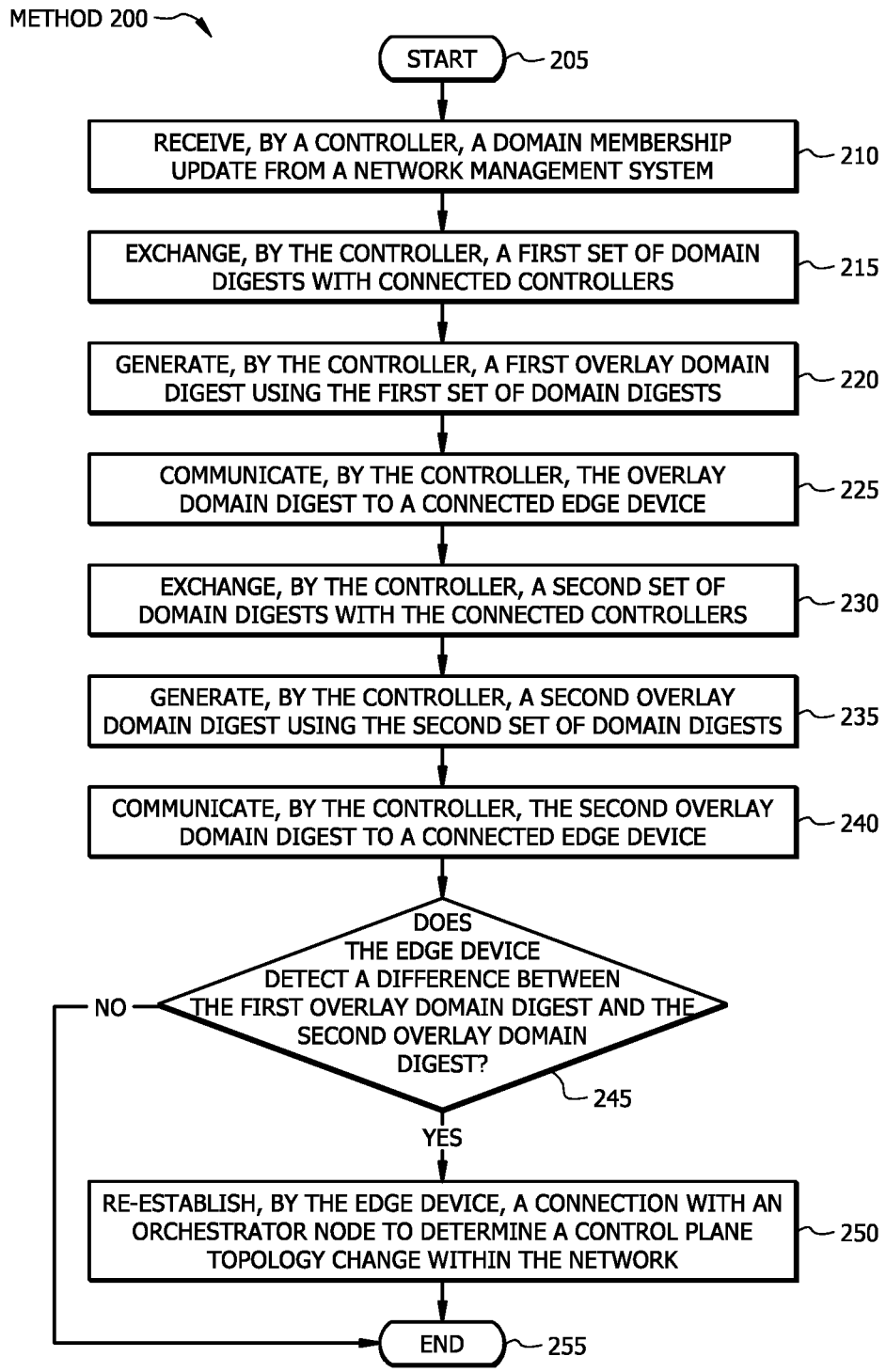
FIG. 2 illustrates an example method for detecting domain changes in an SD-WAN environment.

FIG. 2 illustrates an example method 200 for detecting domain changes in an SD-WAN environment. Method 200 of FIG. 2 may be used by system 100 of FIG. 1. Method 200 starts at step 205. At step 210 of method 200, a controller receives a domain membership update from a network management system. For example, referring to FIG. 1, controller 120a of system 100 may learn about a domain updated upon receiving domain membership update 132(1) from management node 130 via connection 134. In certain embodiments, the controller is a domain-specific controller that hosts multiple tenants or regions. Upon receiving the domain membership update, the controller may generate a domain digest for the domain to which it belongs. For example, referring to FIG. 1, controller 120a of system 100 may generate domain digest 122a(1). In certain embodiments, the local domain digest at each controller is computed for the domain (tenant, region) entities hosted on that controller. The controller maintains a persistent control connection with other participating controllers having an intersecting domain entity. Method 200 then moves from step 210 to step 215.

At step 215 of method 200, the controller exchanges a first set of domain digests with the other connected controllers. For example, referring to FIG. 1, controller 120a of system 120 of system 100 may communicate domain digest 122a(1) to controller 120b and controller 120c, and controller 120a may receive domain digest 122b(1) and domain digest 122c(1) from controller 120b and controller 120c, respectively. In certain embodiments, each controller maintains a database of domain digests of all the controllers to which it is connected. For example, referring to FIG. 1, controller 120a maintains database 126a of domain digests 122a, domain digests 122b, and domain digests 122c, controller 120b maintains database 126b of domain digests 122a, domain digests 122b, and domain digests 122c, and controller 120c maintains database 126c of domain digests 122a, domain digests 122b, and domain digests 122c. In certain embodiments, each database of domain digests may be organized in a sorted manner. For example, the domain digests may be organized based on the controller's UUID. Method 200 then moves from step 215 to step 220.

At step 220 of method 200, the controller generates a first overlay domain digest using its own local domain digest and the domain digests received from the other controllers. For example, referring to FIG. 1, controller 120a may generate overlay domain digest 124a(1) using its own local domain digest 122a(1), domain digest 122b(1) received from controller 120b, and domain digest 122c(1) received from controller 120c. The controller may calculate the overlay domain digest by performing digest calculations of the domain digests stored in its database. Method 200 then moves from step 220 to step 225, where the controller communicates the first overlay domain digest to an edge node connected to the controller. For example, referring to FIG. 1, controller 120a may communicate overlay domain digest 124a(1) to edge node 140. Method 200 then moves from step 225 to step 230.

At step 230 of method 200, the controller exchanges a second set of domain digests with the other connected controllers. For example, referring to FIG. 1, controller 120a of system 120 of system 100 may communicate domain digest 122a(2) to controller 120b and controller 120c, and controller 120a may receive domain digest 122b(2) and domain digest 122c(2) from controller 120b and controller 120c, respectively. Method 200 then moves from step 230 to step 235, where the controller generates a second overlay domain digest using the second set of domain digests. For example, referring to FIG. 1, controller 120a may generate overlay domain digest 124a(2) using its own local domain digest 122a(2), domain digest 122b(2) received from controller 120b, and domain digest 122c(2) received from controller 120c. Method 200 then moves from step 235 to step 240, where the controller communicates the second overlay domain digest to the edge node connected to the controller. For example, referring to FIG. 1, controller 120a may communicate overlay domain digest 124a(2) to edge node 140. Method 200 then moves from step 240 to step 245.

At step 245 of method 200, the edge device determines whether the first overlay domain digest is different than the second overlay domain digest. For example, referring to FIG. 1, edge node 140 compares overlay domain digest 124a(1) received from controller 120a to overlay domain digest 124a(2) received from controller 120a. If the edge node determines that the first overlay domain digest is the same as the second overlay domain digest received from the controller, method 200 advances from step 245 to step 255, where method 200 ends.

If, at step 245, the edge device determines that the first and second overlay domain digests are different, method 200 moves from step 245 to step 250, where the edge device re-establishes a connection with an orchestrator node of the network to determine a control plane domain change within the network. For example, referring to FIG. 1, edge node 140 may re-establish a connection with orchestrator node 150 to determine the change in the control plane domain. The change in the control plane domain may include an added or deleted controller, a change in tenant membership, a change in region membership, and the like. Method 200 then moves from step 250 to step 255, where method 200 ends.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method for detecting domain changes including the particular steps of the method of FIG. 2, this disclosure contemplates any suitable method for detecting domain changes including any suitable steps, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
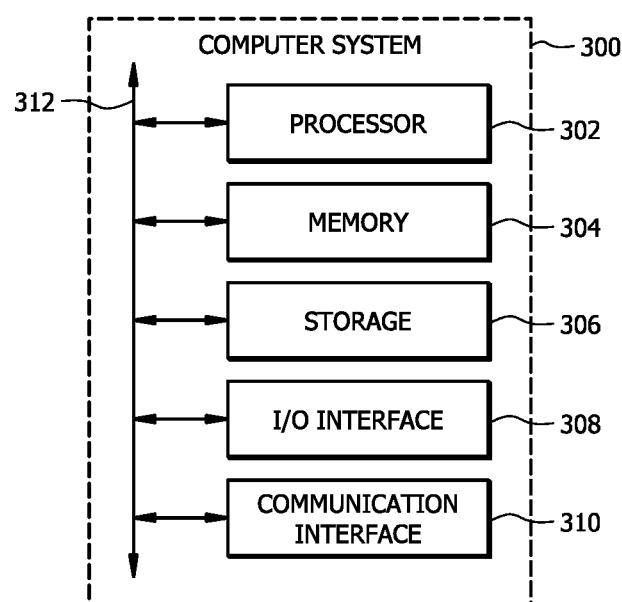
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 404, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or USB drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 406. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 308 may include one or more device or software drivers enabling processor 302 to drive one or more of these I/O devices. I/O interface 308 may include one or more I/O interfaces 408, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising one or more processors and one or more computer-readable non-transitory storage media coupled to the one or more processors and including instructions that, when executed by the one or more processors, cause the system to perform operations comprising:

generating, by a first controller of a network, an overlay domain digest using a first domain digest associated with the first controller of the network and a second domain digest associated with a second controller of the network;

communicating, by the first controller, the overlay domain digest to an edge device of the network;

updating, by the first controller, the overlay domain digest to generate an updated overlay domain digest;

communicating, by the first controller, the updated overlay domain digest to the edge device of the network;

detecting, by the edge device, a difference between the overlay domain digest and the updated overlay domain digest; and re-establishing, by the edge device, a connection with an orchestrator of the network to determine a control plane domain change within the network.

2. The system of claim 1, wherein generating the overlay domain digest comprises performing a digest calculation of the first domain digest and the second domain digest using an Adelson, Velski, and Landis (AVL) tree.

3. The system of claim 1, further comprising receiving, by the first controller, a domain membership update from a network management node, and generating, by the first controller, the first domain digest in response to receiving the domain membership update from the network management node.

4. The system of claim 1, further comprising:
communicating, by the first controller, the first domain digest to the second controller; and
receiving, by the first controller, the second domain digest from the second controller;
wherein the first controller maintains a persistent control connection with the second controller.

5. The system of claim 1, further comprising maintaining, by the first controller, a database of domain digests, wherein the database of domain digests comprises the first domain digest and the second domain digest.

6. The system of claim 1, wherein communicating, by the first controller, the overlay domain digest to the edge device comprises encoding the overlay domain digest into a hello message and communicating the hello message to the edge device.

7. The system of claim 1, wherein:
the first domain digest is a first signature representing a first ordered list of domains in which the first controller participates; and
the second domain digest is a second signature representing a second ordered list of domains in which the second controller participates.

8. A method, comprising:
generating, by a first controller of a network, an overlay domain digest using a first domain digest associated with the first controller of the network and a second domain digest associated with a second controller of the network;
communicating, by the first controller, the overlay domain digest to an edge device of the network;
updating, by the first controller, the overlay domain digest to generate an updated overlay domain digest;
communicating, by the first controller, the updated overlay domain digest to the edge device of the network;
detecting, by the edge device, a difference between the overlay domain digest and the updated overlay domain digest; and
re-establishing, by the edge device, a connection with an orchestrator of the network to determine a control plane domain change within the network.

9. The method of claim 8, wherein generating the overlay domain digest comprises performing a digest calculation of the first domain digest and the second domain digest using an Adelson, Velski, and Landis (AVL) tree.

10. The method of claim 8, further comprising receiving, by the first controller, a domain membership update from a network management node, and generating, by the first controller, the first domain digest in response to receiving the domain membership update from the network management node.

11. The method of claim 8, further comprising:
communicating, by the first controller, the first domain digest to the second controller; and
receiving, by the first controller, the second domain digest from the second controller;
wherein the first controller maintains a persistent control connection with the second controller.

12. The method of claim 8, further comprising maintaining, by the first controller, a database of domain digests, wherein the database of domain digests comprises the first domain digest and the second domain digest.

13. The method of claim 8, wherein communicating, by the first controller, the overlay domain digest to the edge device comprises encoding the overlay domain digest into a hello message and communicating the hello message to the edge device.

14. The method of claim 8, wherein:
the first domain digest is a first signature representing a first ordered list of domains in which the first controller participates; and
the second domain digest is a second signature representing a second ordered list of domains in which the second controller participates.

15. One or more computer-readable non-transitory storage media embodying instructions that, when executed by one or more processors, cause the one or more processors to perform operations comprising:
generating, by a first controller of a network, an overlay domain digest using a first domain digest associated with the first controller of the network and a second domain digest associated with a second controller of the network;
communicating, by the first controller, the overlay domain digest to an edge device of the network;
updating, by the first controller, the overlay domain digest to generate an updated overlay domain digest;
communicating, by the first controller, the updated overlay domain digest to the edge device of the network;
detecting, by the edge device, a difference between the overlay domain digest and the updated overlay domain digest; and
re-establishing, by the edge device, a connection with an orchestrator of the network to determine a control plane domain change within the network.

16. The one or more computer-readable non-transitory storage media of claim 15, wherein generating the overlay domain digest comprises performing a digest calculation of the first domain digest and the second domain digest using an Adelson, Velski, and Landis (AVL) tree.

17. The one or more computer-readable non-transitory storage media of claim 15, further comprising receiving, by the first controller, a domain membership update from a network management node, and generating, by the first controller, the first domain digest in response to receiving the domain membership update from the network management node.

18. The one or more computer-readable non-transitory storage media of claim 15, further comprising:
   communicating, by the first controller, the first domain digest to the second controller; and
   receiving, by the first controller, the second domain digest from the second controller;
   wherein the first controller maintains a persistent control connection with the second controller.

19. The one or more computer-readable non-transitory storage media of claim 15, further comprising maintaining, by the first controller, a database of domain digests, wherein the database of domain digests comprises the first domain digest and the second domain digest.

20. The one or more computer-readable non-transitory storage media of claim 15, wherein communicating, by the first controller, the overlay domain digest to the edge device comprises encoding the overlay domain digest into a hello message and communicating the hello message to the edge device.

* * * * *